United States Patent
Kokaku et al.

[11] Patent Number: 5,104,709
[45] Date of Patent: Apr. 14, 1992

[54] MAGNETIC RECORDING MEDIUM WHICH INCLUDES A PROTECTIVE LAYER, AN ADHESION STRENGTHENING SUBSTANCE AND A LUBRICANT LAYER

[75] Inventors: Yuichi Kokaku; Satoshi Matsunuma, both of Yokohama; Shigehiko Fujimaki, Machida; Makoto Kitoh; Kenji Furusawa, both of Yokohama, all of Japan

[73] Assignee: Hitachi, Ltd., Tokyo, Japan

[21] Appl. No.: 540,187

[22] Filed: Jun. 19, 1990

[30] Foreign Application Priority Data

Jun. 22, 1989 [JP] Japan ............... 1-158191

[51] Int. Cl.$^5$ .................. 428 694; 428 695; 428 900; 428 408; 427 130; 427 122; 204 192.15; 204 192.16; G11B 5/00
[52] U.S. Cl. .................................... 428/64
[58] Field of Search ............ 428/900, 694, 695, 408, 428/64; 427/130, 122; 204/192.15, 192.16; 360/135

[56] References Cited

U.S. PATENT DOCUMENTS

| | | | |
|---|---|---|---|
| 4,808,472 | 2/1989 | Caporiccio et al. | 428/336 |
| 4,840,843 | 6/1989 | Sano et al. | 428/336 |
| 4,849,305 | 7/1989 | Yanagisawa | 428/695 |
| 4,889,767 | 12/1989 | Yokoyama et al. | 428/336 |

*Primary Examiner*—Merrell C. Cashion, Jr.
*Assistant Examiner*—Stevan A. Resan
*Attorney, Agent, or Firm*—Fay, Sharpe, Beall, Fagan, Minnich & McKee

[57] ABSTRACT

The magnetic recording medium of the present invention comprises
(a) a non-magnetic substrate,
(b) a magnetic recording layer containing at least one ferromagnetic substance on at least one side of the substrate,
(c) a protective layer the magnetic recording layer, and
(d) a lubricant layer on the protective layer, wherein an adhesion-strengthening substance which is at least one member selected from the group consisting of metals and metal compounds is distributed substantially uniformly on the layer (c) at the interface between the layer (c) and the layer (d) so as not to cover the whole surface of the layer (c) and so as to contact also with the layer (d).

21 Claims, 2 Drawing Sheets

MAGNETIC RECORDING MEDIUM WHICH INCLUDES A PROTECTIVE LAYER, AN ADHESION STRENGTHENING SUBSTANCE AND A LUBRICANT LAYER

FIELD OF THE INVENTION

The present invention relates to a magnetic recording medium widely used as a recording medium in, for example, electronic calculators, information apparatuses (e.g. word processor) and other electronic apparatuses (e.g. audio tape, video tape), to processes for producing said medium, and to apparatuses using said medium.

DESCRIPTION OF THE RELATED ART

In the field of magnetic recording, the amount of information to be subjected to magnetic recording is increasing year by year. And magnetic recording in higher information amount at a higher speed is desired. Accordingly, the increase in recording density has been the most important task in magnetic recording. In order to achieve it, the improvement in structure and/or material of recording medium has been necessary. With respect to the improvement in structure of recording medium to obtain an increased recording density, making the magnetic recording layer thinner is most effective. The magnetic recording layer has conventionally been formed by mixing a magnetic substance powder with a resin (so-called binder) and coating the mixture on a substrate. Recently, however, there were developed thin film magnetic disks and vapor-deposited magnetic tapes, both obtained by forming a thin film of a magnetic substance alone on a substrate by vacuum deposition, sputtering or the like.

Making the magnetic recording layer thinner leads to the lower mechanical strength of the recording layer. Therefore, it becomes necessary to protect the recording layer. Hence, it has been conducted to cover the surface of the recording layer with a protective film, which is less susceptible to abrasion and damage, and further to coat a lubricant on the protective film so as to minimize the damage incurred by sliding of magnetic head thereon. Accordingly, the combined properties of the protective film and the lubricant determine the life and reliability of magnetic recording medium.

As the protective film of thin film magnetic recording medium, there have hitherto been used amorphous carbon thin films, carbides, etc. for their excellent abrasion resistance. However, it has been found gradually that these protective films have low adsorbability for lubricant; for example, most portion of the lubricant is removed by washing with a chlorofluorocarbon solvent.

Various proposals were made in order to strongly bond the lubricant to the protective film. For example, JP-A-62-234226 discloses a lubricant having, at the molecular end, a functional group which is easily adsorbed on a protective film. JP-A-61-210519 discloses a method for covalently bonding an amido group-containing lubricant to a protective film via said amido group. Further, JP-A-61-220120 discloses a method for forming a metal oxide film on a carbon protective layer and then coating a polar group-containing lubricant on the metal oxide film.

In the above-mentioned conventional method for covalently bonding a lubricant to a protective film to increase the bonding strength between the two, the possible presence of unreacted material impairs lubricity or causes lubricity change with time. Further, the reactivity of the bonded portions is higher than other portions, so that the bonded portions are decomposed more easily by the heat generated by the sliding of magnetic head. When the bond is broken by this thermal decomposition, the probability of its rebonding is very low, making difficult the make-up of lubricant. Moreover, it is very difficult technically to form the bond on the entire surface of the protective film uniformly and at a sufficient density.

Meanwhile, in the method for forming a metal oxide film on a protective film and then allowing the metal oxide film to adsorb a polar group-containing lubricant to increase the bonding strength between the two, the metal oxide film is rubbed directly with the sliding portion of magnetic head via the lubricant layer. In this case, the metal oxide chips generated by the sliding of magnetic head damage the protective layer. And as a result, the advantage of the protective layer having a high strength cannot be utilized sufficiently. Thus, the metal oxide film has a lower strength than carbon films and carbides both used ordinarily as a protective film material. The metal oxide film is disadvantageous in reducing the overall durability of magnetic recording medium Therefore, the object of the present invention is to solve the above-mentioned conventional problems. The first aspect of the present invention is to provide an improved magnetic recording medium having a higher bonding strength between the protective layer and the lubricant layer. The second aspect of the present invention is to provide processes for producing said magnetic recording medium. The third aspect of the present invention is to provide apparatuses using said magnetic recording medium.

SUMMARY OF THE INVENTION

The present inventors made in-depth investigation on the relationship between the friction and abrasion properties of magnetic recording medium and the lubricant used therein (particularly, its coating method, state after coating, amount coated). As a result, it was found to be most effective for the longer life of magnetic recording medium that a lubricant is adsorbed on a protective film uniformly in a sufficient amount at a sufficiently high bonding strength by means of chemical adsorption or the like and not by covalent bonding, without substantially changing the properties required for protective film. When the bonding strength between the protective film and the lubricant is high, shortage of lubricant is less likely to occur and, even if it occurs, can be remedied by readsorption of lubricant.

It was also found that the high bonding strength between the protective film and the lubricant can be obtained by allowing an element other than carbon, particularly a metal element or its compound to exist on the protective film surface and then allowing a lubricant to be adsorbed on the surface via the element or compound. It was further found that in order to achieve this without sacrificing the properties of the protective film, it is effective to allow said element or compound to exist on the protective film surface in a mixed state with the protective film material.

According to the present invention, there are provided a magnetic recording medium comprising
(a) a non-magnetic substrate, (b) a magnetic recording layer containing at least one ferromagnetic substance on at least one side of the substrate, (c) a protective layer on the magnetic recording layer, and (d) a lubricant layer on the protective layer, wherein an adhesion-strengthening substance which is at least one member selected from the group consisting of metals and metal compounds, is distributed substantially uniformly on the layer (c) at the interface between the layer (c) and the layer (d) so as not to cover the whole surface of the layer (c) and so as to contact also with the layer (d); processes for producing said medium; and apparatuses using said medium.

Figure 1:
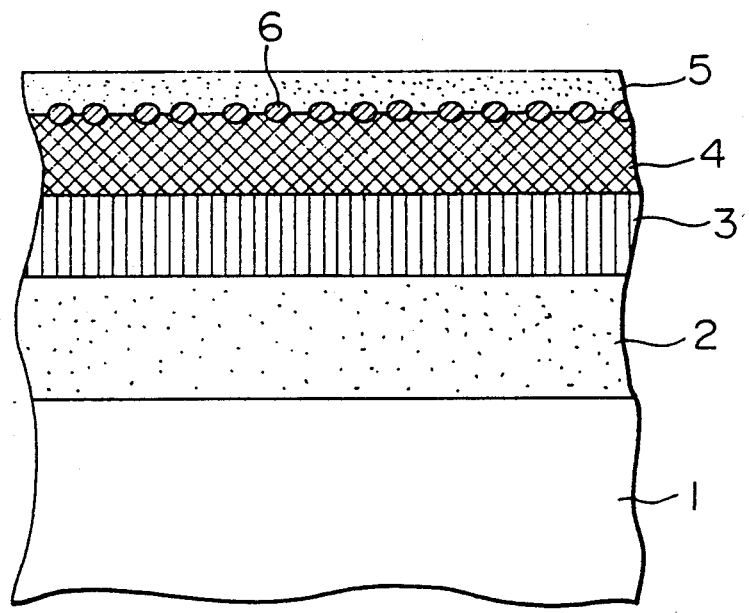
FIG. 1 is a sectional view showing an example of the structure of the magnetic recording medium of the present invention.

In these figures, the numeral 1 refers to a substrate; the numeral 2 refers to a prime coat layer; the numeral 3 refers to a magnetic layer; the numeral 4 refers to a protective layer; the numeral 5 refers to a lubricant layer; the numeral 6 refers to a metal or its compound; the numeral 7 refers to atoms of a metal or to molecules of a compound of the metal; and the numeral 8 refers to agglomerates of atoms of a metal or agglomerates of molecules of a compound of the metal.

DETAILED DESCRIPTION OF THE INVENTION

In the present invention, the atom occupancy proportion of the adhesion-strengthening substance at the surface of the protective layer is preferably 0.50-80%, more preferably 3-60%, most preferably 4-50%. The atom occupancy proportion refers to the occupancy proportion of the adhesion-strengthening substance at the whole surface of the protective layer.

The adhesion-strengthening substance is a metal and/or its compound and preferably has a higher ionization tendency than hydrogen. When the adhesion-strengthening substance is a metal compound, it is desirably at least one compound selected from the group consisting of metal hydroxides, metal salts and metal oxides.

The adhesion-strenghthening substance can be distributed only on the surface of the protective layer, or can be distributed in the interior of the protective layer with the part of the substance appearing at the surface of the protective layer so that the substance looks as if distributed on the surface of the protective layer. It is important in the present invention that the surface of the protective layer is not entirely covered by the adhesion-strengthening substance, that is, the atom occupancy proportion of the substance at the surface of the protective layer is not 100%. When the adhesion-strengthening substance is distributed in the interior of the protective layer, it is preferable that the concentration of the substance in the protective layer increases towards the surface of the protective layer facing the lubricant layer.

The protective layer can be one ordinarily used. Preferably, the protective layer is made of at least one substance of high hardness, selected from, for example, carbon, carbides, nitrides and oxides. In particular, a carbon protective film is preferred.

The lubricant is preferably a chainlike organic compound containing fluorine in the main chain and having, at one or both ends of the molecule, a polar group or an atom having one or two unshared electron pairs.

The lubricant is more preferably a compound represented by the following general formula having a molecular weight of 500-20,000:

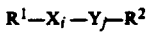

wherein $R^1$ and $R^2$ are independently a group containing O, N, S or P, a group containing a benzene ring or a hydrogen atom, and at least either of $R^1$ and $R^2$ is a group containing O, N, S or P or a group containing a benzene ring; X is a repeating unit of perfluoropolyether or a repeating unit of perfluorohydrocarbon;

Y is a repeating unit of hydrocarbon; $1 \leq i \leq 400$ and $0 \leq j \leq 1400$.

Specific examples of the perfluoropolyether chain are

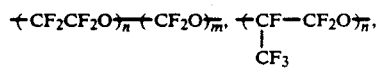

wherein $1 \leq n \leq 240$ and $0 \leq m \leq 240$. The perfluoropolyether chain is preferably

A specific example of the perfluorohydrocarbon chain is $-(CH_2)_n-$ wherein $1 \leq n \leq 240$.

Specific examples of the group containing O, N, S or P are —COOH, —CHO, —COOR (R: $C_1$-$C_{30}$ alkyl, $C_1$-$C_{30}$ fluoroalkyl or $C_1$-$C_{30}$ perfluoroalkyl), —COR (R has the same definition as above),

(R' and R" are independently hydrogen, $C_1$-$C_{30}$ alkyl, $C_1$-$C_{30}$ perfluoroalkyl or $C_1$-$C_{30}$ fluoroalkyloxy),

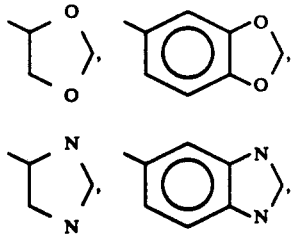

—COOM (M: alkali metal such as Na, Li, etc.), —COOM'— (M': alkaline earth metal such as Mg, Ca etc.), —CONH$_2$, —CONHR' (R' is hydrogen, $C_1$-$C_{30}$ alkyl, $C_1$-$C_{30}$ perfluoroalkyl or $C_1$-$C_{30}$ fluoroalkyloxy) and —CONR'R" (R' and R" are independently hydrogen, $C_1$–$C_{30}$ alkyl, $C_1$–$C_{30}$ perfluoroalkyl or $C_1$–$C_{30}$ fluoroalkyloxy).

Of these, preferred are

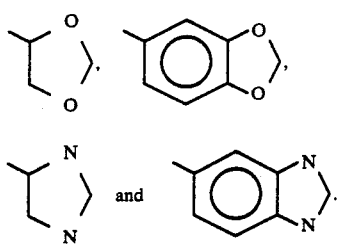

In the above general formula, i is preferably 1–200, more preferably 5–50 and most preferably 10–20.

j is preferably 0–700, more preferably 0–100 and most preferably 0–10.

Of the compounds represented by the above general formula, AM 2001 (trade name) manufactured by Montefluos Inc. is commercially available.

The other aspect of the present invention is to provide a process for producing a magnetic recording medium, comprising the steps of (A) forming a magnetic recording medium layer containing at least one ferromagnetic substance on at least one side of a non-mangetic substance, (B) forming a protective layer on the magnetic recording layer, (C) substantially uniformly distributing an adhesion-strengthening substance which is at least one member selected from the group consisting of metals and metal compounds, on the protective layer so as not to cover the whole surface, and (D) forming a lubricant layer on the protective layer on the surface of which the adhesion-strengthening substance has been distributed.

Preferably, the step (B) for formation of a protective layer on the magnetic recording layer and the step (C) for distribution of an adhesion-strengthening substance on the protective layer are conducted simultaneously. In this case, the process for producing a magnetic recording medium can be expressed as a process comprising the steps of (A') forming a magnetic recording layer containing at least one ferromagnetic substance on at least one side of a non-magnetic substance, (B') forming, on the magnetic recording layer, a protective layer containing an adhesion-strengthening substance, which is at least one member selected from the group consisting of metals and metal compounds, so that most of the particles of the substance are distributed in the protective layer and some of the particles appear on the surface of the protective layer so as not to cover the whole surface, and (C') forming a lubricant layer on the protective layer in which and on the surface of which the adhesion-strengthening substance has been distributed.

The above step (B') for formation of a protective layer containing an adhesion-strengthening substance on the magnetic recording layer can be achieved by (i) effecting sputtering by using a carbon target containing the adhesion-strengthening substance, (ii) subjecting a carbon target and a target consisting of the adhesion-strengthening substance to simultaneous or alternate sputtering, or (iii) decomposing, in a plasma, a vapor of an organic compound containing a metal as the adhesion-strengthening substance or a mixed vapor of an organic compound and a metal compound as the adhesion-strengthening substance.

The above step (B') for formation of a protective layer containing an adhesion-strengthening substance on the magnetic recording layer can also be achieved by generating a plasma with a mixed gas consisting of an organic compound (as a carbon source) and an inert gas to effect plasma CVD and simultaneously sputtering the adhesion-strengthening substance. In effecting the step (B'), it is desirable that the adhesion-strengthening substance be distributed in the interior of the protective layer so that the concentration of the adhesion-strengthening substance in the protective layer increases towards the interface between the protective layer and the lubricant layer.

The metal constituting the adhesion-strengthening substance is preferably a metal having a higher ionization tendency than hydrogen, and the metal compound constituting the adhesion-strengthening substance is preferably at least one compound selected from the group consisting of hydroxides, salts and oxides of such metals.

It is preferable that the adhesion-strengthening substance be allowed to adhere to the surface of the protective layer so as to give an atom occupancy proportion of 0.5–80% at said surface. The adhesion of the adhesion-strengthening substance in such an atom occupancy proportion can be easily achieved by appropriately controlling the deposition and adhesion conditions of the adhesion-strengthening substance in vapor deposition, sputtering, CVD (including plasma CVD) or the like.

In the step of coating the lubricant, it is desirable to use, as the lubricant, a chainlike organic compound having, at one or both ends of the molecule, a polar group or an atom having one or two unshared electron pairs and containing fluorine in the main chain.

The present invention is described more specifically below referring to drawings.

FIG. 1 is a conceptual view of the section of a magnetic recording medium as an embodiment of the present invention, wherein a prime coat layer 2, a magnetic layer 3, a protective layer 4 and a lubricant layer 5 are formed in this order on a non-magnetic substrate 1.

The non-magnetic substrate 1 can be one ordinarily used in magnetic recording media. For example, when the magnetic recording medium of the present invention is used in magnetic disks, the substrate 1 is ordinarily made of an inorganic material such as Al, glass, ceramic or the like; when the magnetic recording medium is used in floppy disks, magnetic tapes, etc., the substrate 1 is a film made of a high molecular compound such as polyester, polyimide or the like. Not shown in FIG. 1, but it is possible to form, on the surface of the non-magnetic substrate 1, a plated Ni-P film or a non-magnetic film of oxide, nitride or the like in order to make the substrate 1 harder.

The prime coat layer is to increase the orientation degree of the magnetic layer. As the prime coat layer, there can be used, for example, a Cr film formed by sputtering. This layer is not necessarily required.

The magnetic layer 3 is a film having ferromagnetism. As the layer, there can be used, for example, a Co-based alloy (e.g. Co-Ni, Co-Cr); an alloy between said elements and at least one element selected from Pt, Ta, W, Zr, Cr, Mo, Ti, V, Si, Ge, etc.; Fe; iron nitride; γ-$Fe_2O_3$; Co oxide; and Ba ferrite.

The protective layer 4 is to protect the magnetic layer from friction and abrasion As the protective layer, there are used a carbon film formed by sputtering; a hard carbon film formed by plasma CVD or ion beam deposition; and a film made of a highly abrasion-resistant material such as carbide, nitride, oxide or the like. When a carbon film is formed by sputtering, (i) a plasma of an inert gas (e.g. Ar) is generated with a graphite target used as a cathode, or (ii) said target is hit by a high-energy ion beam to deposit a carbon film on a substrate facing the target. When a hard carbon film is formed by plasma CVD, a plasma is generated using, as the material, a gas of a hydrocarbon (e.g. methane, ethane, propane) or an oxygen-containing hydrocarbon (e.g. methanol, acetone) and then CVD is effected so that the substrate potential as compared with the plasma potential becomes a negative potential of about $-100$ V to $-2,000$ V.

When the protective layer is a film made of a carbide or nitride, the film can be formed by (i) sputtering using a target consisting of said carbide or nitride, (ii) co-sputtering wherein targets each consisting of one element of the carbide or nitride are subjected to simultaneous sputtering, or (iii) reactive sputtering wherein sputtering is effected in a nitrogen gas atmosphere. It is possible that the protective layer 4 be formed in a two-layered structure and one of them be a highly corrosion-resistant film made of $SiO_2$ or the like.

The lubricant layer 5 is, for example, a polymer or oligomer having a molecular weight of about 500 to 20,000, preferably 1,000 to 10,000. The polymer or oligomer preferably has perfluoropolyether in the main chain. It is preferably a compound having, at one or both ends of the molecule, a polar group or an atom having one or two unshared electron pairs (e.g. O, N, P, S).

On the surface of the protective layer 4 is distributed an adhesion-strengthening substance consisting of a metal and/or its compound (this is a requirement in the present invention), and a lubricant is adsorbed on the surface via the substance 6. The adhesion-strengthening substance can be a metal or its compound (e.g. metal oxide, metal hydroxide, metal salt). A metal hydroxide is preferable because it has a higher adhesion-strengthening effect. The reason for the higher effect of the metal hydroxide is presumed to be that the hydroxyl group of metal hydroxide forms a hydrogen bond with the terminal group of lubricant.

Figure 2A:
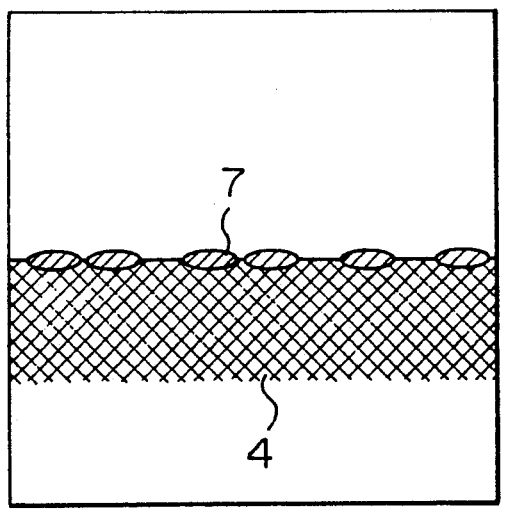
FIG. 2 is a sectional view showing typical examples of the state in which a metal or its compound exists in the magnetic recording medium of the present invention.
Figure 2B:
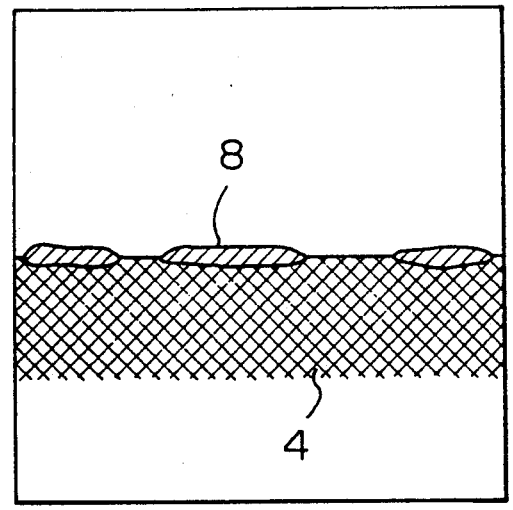

Another requirement in the present invention is that the adhesion-strengthening substance does not cover the whole surface of the protective layer and coexist with the material constituting the protective layer, at the surface of the protective layer. FIG. 2 illustrates models of dispersion of a metal or its compound at the surface of the protective layer 4. Dispersion in atom or molecule state [7 of FIG. 2(a)] is most preferable. Dispersion in island-shaped agglomerates of atoms or molecules [8 of FIG. 2(b)] is also effective as long as the agglomerates do not cover the whole surface of the protective layer. When the surface of the protective layer is covered completely by the metal or its compound and there is formed a film of the metal or its compound, this film is broken at the time of sliding against magnetic head due to the insufficient strength of the film and accordingly gives lower resistance to sliding. Meanwhile, when the metal or its compound is dispersed on the surface of the protective layer so as not to cover the entire surface of the protective layer, the protective layer exhibits a sliding property similar to that of the material alone of the protective layer and yet has a higher lubricant adsorbability.

Figure 3:
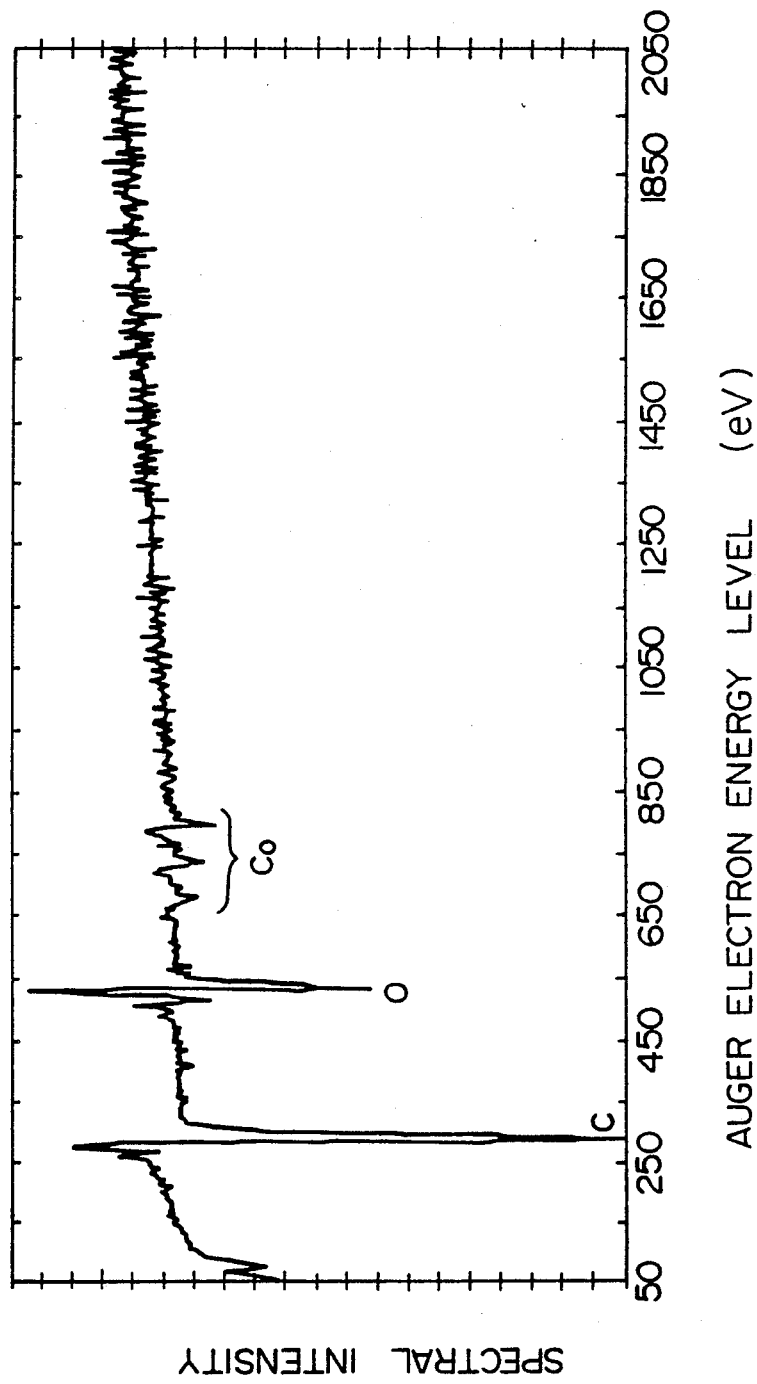
FIG. 3 is the Auger electron spectrum curve of the outermost surface of the protective film formed in one Example of the present invention, at said surface a metal or its compound being dispersed in the protective film material.

The amount and distribution of the metal or its compound on the surface of the protective layer can be examined by conventional surface analysis such as photoelectronic spectroscopy, Auger electron spectroscopy or the like. FIG. 3 is an Auger electron spectrum obtained by forming a carbon protective film of the present invention in which and at the surface of which a metal (Co in this case) has been distributed and then effecting an Auger electron analysis for the film. In FIG. 3, there is observed an intense carbon (C) spectrum, which indicates that the metal does not cover the whole surface of the protective film. In FIG. 3, the ordinate refers to spectral intensity, which means the relative amount of atom; the abscissa refers to energy level; there appear spectra unique to individual atoms and, in this case, there are seen spectra of three elements, i.e. C, O and Co. Accordingly, it is appreciated from the spectral intensities that C exists on the surface of the protective film in a largest amount between the amounts of the three elements and 0 and Co come next in this order. Using these spectral intensities can give a relative spectral intensity of each element. The surface atom occupancy proportion used in the present invention refers to the thus obtained relative spectral intensity of each element. In this case, the surface atom occupancy proportion of Co is ten and odd %.

The experiment by the present inventors indicated that the surface atom occupancy proportion of the adhesion-strengthening substance (metal or its compound) is preferably 0.5% or more in order to allow the lubricant to sufficiently cover the surface of the protective layer and preferably 80% or less in order for the sliding property of the protective layer not to be impaired. The surface atom occupancy proportion is more preferably 3-60% and most preferably 4-50%.

The distribution of a metal on the surface of the protective layer can be achieved by, for example, the following methods.

I. After the formation of a protective layer, sputtering is effected using a target made of a particular metal, or vacuum deposition of the metal is effected, whereby the metal is allowed to adhere onto the surface of the protective layer.

II. After the formation of a protective layer, a plasma is generated with a material consisting of a gas containing a compound of a particular metal, and the metal or its compound is allowed to adhere onto the surface of the protective layer.

III. After the formation of a protective layer, the protective layer is immersed in a solution containing a particular metal and/or its compound, and then dried to allow the metal and/or its compound to adhere onto the surface of the protective layer.

IV. Sputtering is effected using a target consisting of a carbon material containing a metal, to form a carbon film containing the metal.

V. A metal target and a carbon target are arranged side by side and are subjected to simultaneous sputtering to form a carbon film containing the metal.

VI. A carbon material is subjected to sputtering or plasma CVD, and simultaneously a metal wire placed in the vicinity of a substrate is electrified to heat the metal wire to vaporize the metal, whereby a carbon film containing the metal is formed.

The metal-containing carbon film formed by one of the above methods II, IV, V and VI, when slightly etched at the surface by an oxygen plasma to increase the density of metal atoms at the surface, can have a higher adhesion-strengthening effect. The metal-containing carbon film, when allowed to stand in an atmosphere having a high steam partial pressure for a given length of time to convert the metal to its hydroxide or ion (as a result, the hydroxide or ion is distributed uniformly at the surface of the carbon film), can have an even higher adhesion-strengthening effect.

The metal as or in the adhesion-strengthening substance of the present invention can be any metal in principle. As such a metal, there can be named, for example, Sc, Ti, V, Cr, Mn, Fe, Co, Ni, Y, Zr, Nb, Mo, Cu, Pd, Ag, Hf, Ta, W, Ir, Pt, Au, Al, Ga, In, Ge, Sn, Pb, Ba, Ca, Mg, Li, Na, K and Be. Of these, preferred are transition metal elements falling in the IIa–VIIa groups of the periodic table, or metal elements having a higher ionization tendency than hydrogen. Especially, the metal elements of the group consisting of Cr, Fe, Co, Ni, Al, Sn and Ti have a high adhesion-strengthening effect. Moreover, these metal elements are preferable from the process standpoint because they can be easily distributed in and on the protective film by the same method (e.g. sputtering) as used in the formation of protective layer.

The lubricant is preferably a chain like organic compound containing fluorine in the main chain and having, at one or both ends of the molecule, a polar group or an atom having one or two unshared electron pairs.

The lubricant is more preferably a compound represented by the following general formula having a molecular weight of 500–20,000:

$$R^1-X_i-Y_j-R^2$$

wherein $R^1$ and $R^2$ are independently a group containing O, N, S or P, a group containing a benzene ring or a hydrogen atom, and at least either of $R^1$ and $R^2$ is a group containing O, N, S or P or a group containing a benzene ring; X is a repeating unit of perfluoropolyether or a repeating unit of perfluorohydrocarbon; Y is a repeating unit of hydrocarbon; $1 \leq i \leq 400$ and $0 \leq j \leq 1400$.

Specific examples of the perfluoropolyether chain are

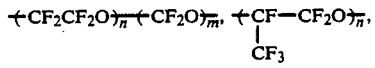

wherein $1 \leq n \leq 240$ and $0 \leq m \leq 240$. The perfluoropolyether chain is preferably

A specific example of the perfluorohydrocarbon chain is $-(CH_2)_n-$ wherein $1 \leq n \leq 240$.

Specific examples of the group containing O, N, S or P are $-COOH$, $-CHO$, $-COOR$ (R: $C_1-C_{30}$ alkyl, $C_1-C_{30}$ fluoroalkyl or $C_1-C_{30}$ perfluoroalkyl), $-COR$ (R has the same definition as above),

(R' and R" are independently hydrogen, $C_1-C_{30}$ alkyl, $C_1-C_{30}$ perfluoroalkyl or $C_1-C_{30}$ fluoroalkyloxy),

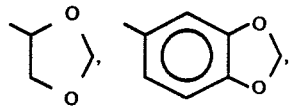

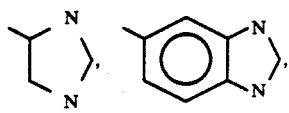

$-COOM$ (M: alkali metal such as Na, Li, etc.), $-COOM'-$ (M': alkaline earth metal such as Mg, Ca etc.), $-CONH_2$, $-CONHR'$ (R' is hydrogen, $C_1-C_{30}$ alkyl, $C_1-C_{30}$ perfluoroalkyl or $C_1-C_{30}$ fluoroalkyloxy) and $-CONR'R''$ (R' and R" are independently hydrogen, $C_1-C_{30}$ alkyl, $C_1-C_{30}$ perfluoroalkyl or $C_1-C_{30}$ fluoroalkyloxy), of these, preferred are

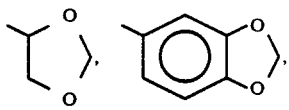

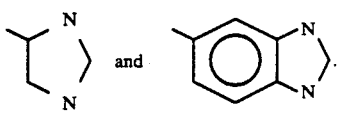

In the above general formula, i is preferably 1–200, more preferably 5–50 and most preferably 10–20.

j is preferably 0–700, more preferably 0–100 and most preferably 0–10.

Of the compounds represented by the above general formula, AM 2001 (trade name) manufactured by Montefluos Inc. is commercially available.

In effecting the process of the present invention, it is possible that the prime coat layer 2 to the protective layer 4 be formed using a conventional film-forming apparatus and then a metal be subjected to sputtering. When the prime coat layer 2 to the protective layer 4 are conventionally formed by sputtering, the formation of the prime coat layer 2 to the protective layer 4 can be simply effected by only adding a target for metal adhesion. When a metal is distributed in the interior of the protective layer 4, the formation of the prime coat layer 2 to the protective layer 4 can be effected more simply without adding any new step, by using a target consisting of a protective layer material containing the metal or by using plasma CVD of organic metal compound.

The reason why in the present invention the lubricant is strongly adsorbed on the protective layer and shows good lubricity, is not made sufficiently clear, but is presumed to be as follows.

Many of metals tend to form a coordination bond with atoms in a polar group present in the lubricant or atoms having one or two unshared electron pairs, such as O, N, S and P present in the lubricant. This coordination bond is reversible and has a fairly high strength as compared with ordinary intermolecular forces. Most of the metal atoms present at the surface of the protective layer take a form of hydroxide or oxide, and particularly the hydroxide tends to form a hydrogen bond with the atoms mentioned above. Further, the surface per se of the protective layer is actually oxidized to some extent and the oxygen atoms of the surface also tend to form a coordination bond with the metal atoms. Owing to these actions, there arise strong adsorption of the lubricant on the surface of the protective layer via the metal and/or the metal compound.

EXAMPLES 1-3

Three different magnetic recording disks each having the same layer structure as in FIG. 1 were prepared and measured for properties.

On an Al substrate 1 was formed a Ni-P film of 10 μm in thickness by plating. On the plated Ni-P film were formed, by sputtering, a Cr prime coat layer 2, a Co-Ni alloy magnetic layer 3 and a carbon protective layer 4 in this order. The sputtering for formation of carbon protective layer was effected by using a graphite target, an Ar gas pressure of 5 m Torr and a DC sputtering method. Then, Ni atoms were allowed to adhere onto the protective layer 4 by sputtering. The product was immersed in a fluorocarbon (Freon) solution containing 0.2% by weight of a fluorine-based lubricant 5 and pulled up at a given speed to form a lubricant layer. Incidentally, AM 2001 (trade name) manufactured by Monteflos Inc. was used as the fluorine-based lubricant. The thus prepared three magnetic recording disks were measured for durability by a contact start stop (CSS) tester.

Table 1 shows the results. The results demonstrated that all the disks had a CSS life of more than 30,000 times (the CSS life of more than 30,000 times has been set as a limit necessary in practical use). The disks also showed a small increase in friction coefficient during the test.

Comparing the results of Examples 1-3, shows that the CSS life varies depending upon the surface atom occupancy proportion of metal atoms and that the disks provide the longest CSS life when the occupancy proportion is 5%. However, too small an occupancy gave an insufficient adhesion-strengthening effect although the data are not shown in Table 1. The adhesion proportion was preferably 0.5-80%, more preferably 3-60%, most preferably 4-50% from a practical viewpoint. Incidentally, the surface atom occupancy proportion of metal element in Table 1 was obtained, as explained previously, i.e. by measuring the Auger electron spectrum of the protective layer surface after adhesion of Ni atoms and making calculation using the spectrum.

Three different disk apparatuses were assembled each using eight same magnetic recording disks prepared as above and, were operated actually. All the apparatuses gave no abnormality during 2,000-hour operation and, in the subsequent observation of disk surface, showed neither damage by sliding nor stain.

EXAMPLES 4-15

In the same manner as in Example 1 were formed, on the Ni-P film formed on an Al substrate by plating, a Cr prime coat layer, a Co-Ni ally magnetic layer and a carbon protective layer in this order by sputtering. Metal atoms were allowed to adhere onto the carbon protective layer in various adhesion proportions by sputtering. The product was coated with the same lubricant as used in Example 1 in the same manner as employed in Example 1 to prepare 12 different magnetic recording disks. The disks were subjected to the same CSS test as in Example 1. The proportion of metal atoms on protective layer surface was measured by Auger electron spectroscopy in the same manner as in Example 1.

The results are shown in Table 1. All the disks had a CSS life of more than 30,000 times. The disks also showed a small increase in friction coefficient during the test.

COMPARATIVE EXAMPLE 1

A magnetic recording disk was prepared in the same manner as in Example 1 except that the lubricant was coated on the carbon protective layer surface without sputtering a metal onto said surface. The disk gave a CSS life of 15,000 times and the friction coefficient increased with an increase of CSS times. A magnetic recording disk apparatus was assembled using each of eight same magnetic recording disks prepared as above and, operated actually. When the operation exceeded 500 hours, the friction coefficient became so large that the disk movement stopped.

COMPARATIVE EXAMPLE 2

A magnetic recording disk was prepared in the same manner as in Example 1 except that the adhesion of Ni atoms on protective layer surface was effected so that the protective layer surface was completely covered by Ni at a thickness of 10 nm by sputtering. The disk, when subjected to the same CSS test as in Example 1, caused cruching at 70,000 times, and both the magnetic head and the magnetic disk were damaged. The damage of the magnetic disk in particular reached as far as the magnetic layer.

TABLE 1

| | Metal element | Surface atom occupancy proportion of metal element (%) | CSS life ($\times 10^3$ times) |
|---|---|---|---|
| Example 1 | Ni | 20 | 53 |
| Example 2 | Ni | 50 | 45 |
| Example 3 | Ni | 5 | 60 |
| Example 4 | Co | 50 | 40 |
| Example 5 | Co | 10 | 58 |
| Example 6 | Co | 5 | 59 |
| Example 7 | Fe | 50 | 46 |
| Example 8 | Fe | 10 | 65 |
| Example 9 | Fe | 5 | 70 |
| Example 10 | Cr | 50 | 43 |
| Example 11 | Cr | 10 | 60 |
| Example 12 | Cr | 5 | 63 |
| Example 13 | Al | 50 | 50 |
| Example 14 | Al | 10 | 65 |
| Example 15 | Al | 5 | 68 |
| Comparative Example 1 | Note used | — | 15 |
| Comparative Example 2 | Ni | 100*1 | 7 |

*1 Thickness of metal element layer: 10 nm

EXAMPLES 16-20

In the sputtering for formation of a carbon protective layer in Example 1, the graphite target was replaced by a target consisting of a mixture of graphite and a given amount of a metal element, to form a carbon protective layer containing the metal element. The product was coated with the same lubricant as in Example 1 in the same manner as in Example 1, to prepare five different magnetic recording disks. The disks were measured for CSS life.

The results are shown in Table 2. All the disks gave a CSS life of more than 30,000 times. The disks also showed a small increase in friction coefficient during the test.

TABLE 2

| Example No. | Metal element | M* (%) | Surface atom occupancy proportion of metal element (%) | CSS life (×10³ times) |
|---|---|---|---|---|
| 16 | Fe | 10 | 15 | 45 |
| 17 | Cr | 5 | 8 | 55 |
| 18 | Al | 5 | 10 | 60 |
| 19 | Ti | 5 | 5 | 72 |
| 20 | Sn | 10 | 12 | 65 |

EXAMPLES 21-25

On an Al substrate was formed a Ni-P film of 10 μm in thickness by plating. On the plated Ni-P film were formed, by sputtering, a Cr prime coat layer and a Co-Ni alloy magnetic layer in this order. The product was placed in a methane gas atmosphere and a high frequency electric power was applied to the system so that the product had a negative bias voltage, to generate a plasma to form, as a protective layer, a hard amorphous hydrogenated carbon film on the magnetic layer. Metal atoms were allowed to adhere onto the protective layer by sputtering, in the same manner as in Example 1. Then, the same lubricant was coated in the same manner as in Example 1 to prepare five different magnetic recording disks. The disks were subjected to the same CSS test as in Example 1.

The results are shown in Table 3. All the disks gave a CSS life of more than 70,000 times. The disks also showed no increase in friction coefficient during the test.

TABLE 3

| Example No. | Metal element | Surface atom occupancy proportion of metal element (%) | CSS life (×10³ times) |
|---|---|---|---|
| 21 | Ni | 7 | 83 |
| 22 | Co | 8 | 92 |
| 23 | Fe | 10 | 110 |
| 24 | Cr | 25 | 72 |
| 25 | Al | 18 | 95 |

EXAMPLES 26-30

Plasma CVD was effected in the same procedure as in Example 21 except that eh methane gas used in Example 21 was replaced by a mixture of methane gas and a vapor of an organometal compound or a metal halide compound, to form a hard carbon film containing 1-10% of the metal atoms. Then, the same lubricant as in Example 1 was coated in the same manner as in Example 1 to prepare five different magnetic recording disks. The disks were subjected to the same CSS test as in Example 1. The results are shown in Table 4. All the disks gave a CSS life of more than 70,000 times. The disks also showed no increase in friction coefficient during the test.

TABLE 4

| Example No. | Organometal compound or metal halide | Surface atom occupancy proportion of metal element (%) | CSS life (×10³ times) |
|---|---|---|---|
| 26 | Ferrocene | 5 | 95 |
| 27 | Chromocene | 4 | 82 |
| 28 | Tetramethyltin | 10 | 79 |
| 29 | Trimethoxyaluminum | 5 | 73 |
| 30 | Tetrachlorotitanium | 8 | 85 |

EXAMPLE 31 AND COMPARATIVE EXAMPLE 3

On the surface of a polyester film of 10 μm in thickness was formed a Co-Ni alloy thin film of 500 Å in thickness by vacuum deposition. Thereon was formed a hard carbon film of 0.02 μm containing 0.5% of Fe, by the same plasma CVD method as in Example 21 except that an organic metal compound (ferrocene) was used in addition to methane gas. The product was coated with the same lubricant as used in Example 1. The resulting product was cut into an 8-mm width to prepare a magnetic recording tape. Using this tape, repeated regeneration of still image in VTR was effected and there was measured a time (still life) until the regenerated still image had an output 10% lower than the original output.

The results are shown in Table 5. The above tape gave a still life about 3 times that of the tape of Comparative Example 3 containing no Fe and showed a slight surface damage after the test.

TABLE 5

| | Organometal compound | Surface atom occupancy proportion of metal element (%) | Still life (minute) |
|---|---|---|---|
| Example 31 | Ferrocene | 5 | 158 |
| Comparative Example 3 | Not used | 0 | 48 |

EXAMPLE 32

A permalloy film of 0.2 μm in thickness was formed by sputtering on both sides of a polyimide film of 50 μm in thickness. On one of the resulting films was formed, by sputtering, a Co-Cr alloy recording film for vertical magnetization, of 0.1 μm in thickness. Thereon was formed an amorphous carbon protective film containing 0.5% of Fe, having a thickness of 0.02 μm, by the same plasma CVD method as in Example 31. The resulting film was passed through the same fluorocarbon (Freon) solution (containing 0.2% of the same lubricant) as used in Example 1 to allow the lubricant to adhere onto the surface of the film. From the resulting film was cut out a disk of 3.5 inches in diameter. Against this disk was pressed, with a load of 20 kg, a saphire-made slider having a surface of spherical shape of 30 mm in diameter; under this condition, the disk was rotated at 1,000 rpm to examine its abrasion resistance. As a result, there appeared no abrasion reaching the magnetic layer, after 30-minute sliding (rotation).

Comparative Example 4

On the same polyimide film as in Example 32 were formed a permalloy film, a Co-Cr alloy recording film and an amorphous carbon protective film in this order, in the same manner as in Example 32 except that only methane was used as a material for amorphous carbon protective film and the resulting protective film contained no metal. A disk was cut out from the resulting film in the same manner as in Example 32 and subjected to the same sliding test as in Example 32 to examine its abrasion resistance. As a result, the disk had abrasion reaching the magnetic layer after 8-minute sliding and the magnetic layer was broken.

EXAMPLE 33

On an Al substrate having a plated Ni-P film thereon were formed a Cr prime coat layer and a Co-Ni alloy magnetic layer in this order, in the same manner as in Example 1. Then, sputtering was effected in an Ar gas atmosphere using a sintered SiC target to form a SiC protective layer of 50 mm in thickness on the Co-Ni alloy magnetic layer. It was confirmed by electron spectroscopy that the protective layer had a SiC structure. A slight amount of Ni was allowed to adhere onto the surface of SiC protective layer by sputtering in the same manner as in Example 1. A lubricant [AM 2001 (trade name)] was coated thereon, to prepare a magnetic recording disk. The disk was subjected to the same CSS test as in Example 1 to examine its durability. There was neither crushing nor increase in friction coefficient, up to 30,000 CSS times.

EXAMPLE 34

On an Al substrate having a plated Ni-P film thereon were formed a Cr prime coat layer, a Co-Ni alloy magnetic layer and a carbon protective layer in this order, in the same manner as in Example 1. Ni was allowed to adhere onto the surface of the protective layer by sputtering. The surface atom occupancy proportion of Ni was 20%. The resulting disk was allowed to stand in an atmosphere of 80% relative humidity at room temperature for 2 hours and then its surface was coated with a lubricant [AM 2001 (trade name)] to prepare a magnetic recording disk. The disk was subjected to the same CSS test as in Example 1 to examine its durability. There was neither crushing nor increase in friction coefficient, up to 60,000 CSS times.

As described above, in the present invention, the protective layer of magnetic recording medium can adsorb a lubricant strongly, and as a result the resulting magnetic recording medium can have longer life and a higher reliability. Further, the magnetic recording medium can have sufficient lubricity even when the thickness of protective layer is made small or the height of floatation of magnetic head is made small, and consequently can reduce its mechanical damage and enables high density recording.

What is claimed is:
1. A magnetic recording medium which comprises:
   (a) a non-magnetic substrate;
   (b) a magnetic recording layer containing at least one ferromagnetic substance on at least one side of the substrate;
   (c) a protective layer on the magnetic recording layer; and
   (d) a lubricant layer on the protective layer, wherein an adhesion-strengthening substance which is at least one member selected from the group consisting of metals and metal compounds selected from the group consisting of metal oxides, metal hydroxides and metal salts, is distributed substantially uniformly on the layer (c) at the interface between the layer (c) and the layer (d) so as not to cover the whole surface of the layer (c) and so as to contact also with the layer (d), an atom occupancy proportion of the adhesion-strengthening substance at the surface of the protection layer being about 3-60%.

2. The medium of claim 1, wherein the adhesion-strengthening substance is not only distributed substantially uniformly on the layer (c) but also distributed substantially uniformly in the interior of the layer (c).

3. The medium of claim 1, wherein the adhesion-strengthening substance is not only distributed substantially uniformly on the layer (c) but also distributed in the interior of the layer (c) so that the concentration of the adhesion-strengthening substance in the layer c) increases towards the interface between the layer (c) and the layer (d).

4. The medium of claim 1, wherein the metals and metal compounds are metals having a higher ionization tendency than hydrogen, hydroxides of metals having a higher ionization tendency than hydrogen, salts of metals having a higher ionization tendency than hydrogen or oxides of metals having a higher ionization tendency than hydrogen.

5. The medium of claim 1, wherein the protective layer comprises at least one member selected from the group consisting of carbon, carbides, nitrides and oxides.

6. The medium of claim 1, wherein the lubricant layer comprises a linear organic compound which contains either a polar group or an atom having one or two unshared electron pairs in one or both ends of the molecule and which contains fluorine in the main chain of the molecule.

7. A magnetic recording disk which comprises the medium of claim 1, the substrate being discoid.

8. A disk apparatus which comprises the disk of claim 7 as the magnetic disk.

9. A process for producing a magnetic recording medium which comprises the steps of:
   (a') forming a magnetic recording layer containing at least one ferromagnetic substance on at least one side of a non-magnetic substrate;
   (b') forming, on the magnetic recording layer, a protective layer containing an adhesion-strengthening substance, which is at least one member selected from the group consisting of metals and metal compounds, so that an atom occupancy proportion of the adhesion-strengthening substance at a surface of the protective layer is about 3-60% and
   (C') forming a lubricant layer on the protective layer in which and on the surface of which the adhesion-strengthening substance has been distributed.

10. The process of claim 9, wherein the step (B') comprises forming, on the magnetic recording layer formed by the step (A'), a protective layer by sputtering employing a carbon target containing the adhesion-strengthening substance.

11. The process of claim 9, wherein the step (B') comprises forming, on the magnetic recording layer formed by the step (A'), a protective layer by sputtering employing a carbon target and an adhesion-strengthening substance target simultaneously or alternately.

12. The process of claim 9, wherein the step (B') comprises decomposing in a plasma a mixed vapor consisting of (i) a metal-containing organic compound or a metal-containing compound and (ii) an organic compound.

13. The process of claim 9, wherein the step (B') comprises generating a plasma with a mixed gas consisting of an organic compound and an inert gas to effect plasma CVD and simultaneously sputtering the adhesion-strengthening substance on the magnetic recording layer formed by the step (A').

14. The process of claim 4, wherein the step (B') further comprises selecting metals and metal compounds, selected from the group consisting of metals having a higher ionization tendency than hydrogen, hydroxides of metals having a higher ionization tendency than hydrogen, salts of metals having a higher ionization tendency than hydrogen, and oxides of metals having a higher ionization tendency than hydrogen.

15. The process of claim 9, which comprises carrying out the step (B') so that the adhesion-strengthening substance is not only distributed substantially uniformly on the surface of the protecting layer but also distributed in the interior of the protecting layer, whereby the concentration of the substance increases towards the surface of the protecting layer.

16. The process of claim 9, which comprises selecting as a lubricant in the step (C') a linear organic compound which contains either a polar group or an atom having one or two unshared electron pairs in one or both ends of the molecule and which contains fluorine in the main chain of the molecule.

17. The process of claim 9, wherein the step (C') comprises carrying out a plasma treatment before the formation of the lubricant layer.

18. A process for producing a magnetic recording medium which comprises the steps of:
(A) forming a magnetic recording layer containing at least one ferromagnetic substance on at least one side of a non-magnetic substrate;
(B) forming a protective layer on the magnetic recording layer;
(C) substantially uniformly distributing an adhesion-strengthening substance which is at least one member selected from the group consisting of metals and metal compounds selected from the group consisting of metal oxides, metal hydroxides and metal salts on the protective layer so as to give an atom occupancy proportion of the adhesion-strengthening substance at a surface of the protective layer of about 3-60% and
(D) forming a lubricant layer on the protective layer on the surface of which the adhesion-strengthening substance has been distributed.

19. The process of claim 18, wherein the step (C) further comprises selecting metals and metal compounds selected from the group consisting of metals having a higher ionization tendency than hydrogen, hydroxides of metals having a higher ionization tendency than hydrogen, salts of metals having a higher ionization tendency than hydrogen, and oxides of metals having a higher ionization tendency than hydrogen.

20. The process of claim 18, which comprises selecting as a lubricant in the step (D) a linear organic compound which contains either a polar group or an atom having one or two unshared electron pairs in one or both ends of the molecule and which contains fluorine int he main chain of the molecule.

21. The process of claim 18, wherein the step (D) comprises carrying out a plasma treatment before the formation of the lubricant layer.

* * * * *